United States Patent
Arakawa (10) Patent No.: US 11,261,268 B2
(45) Date of Patent: Mar. 1, 2022

(54) METHOD FOR PRODUCING HETEROPHASIC PROPYLENE POLYMERIZATION MATERIAL PARTICLES

(71) Applicant: SUMITOMO CHEMICAL COMPANY, LIMITED, Tokyo (JP)

(72) Inventor: Masayuki Arakawa, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 2 days.

(21) Appl. No.: 16/829,479

(22) Filed: Mar. 25, 2020

(65) Prior Publication Data
US 2020/0308317 A1    Oct. 1, 2020

(30) Foreign Application Priority Data
Mar. 29, 2019    (JP) .............................. JP2019-067277

(51) Int. Cl.
*C08F 6/28*    (2006.01)

(52) U.S. Cl.
CPC ..................... *C08F 6/28* (2013.01)

(58) Field of Classification Search
CPC ........ C08F 10/06; C08F 210/06; C08F 2/001; C08F 2/34; C08F 6/28; C08L 23/14; C08L 2207/02
See application file for complete search history.

(56) References Cited

U.S. PATENT DOCUMENTS

2014/0202847 A1*    7/2014    Bergstra .................... B29B 9/16
                                                            203/96

FOREIGN PATENT DOCUMENTS

| EP | 2743279 A1 | 6/2014 |
| JP | 2013-256597 | 12/2013 |
| JP | 2015-71661 | 4/2015 |
| WO | 2004/039848 A1 | 5/2004 |

OTHER PUBLICATIONS

Extended Search Report dated Oct. 15, 2020 in EP application No. 20161973.1 (5 pages).

* cited by examiner

*Primary Examiner* — Robert D Harlan
(74) *Attorney, Agent, or Firm* — Meunier Carlin & Curfman LLC (57) ABSTRACT

Provided is a particle drying method capable of sufficiently removing the volatile component and down-regulating the increase of the viscosity of the particles after the removal of the volatile component. There is provided a method for producing heterophasic propylene polymerization material particles, the method including: (1) performing monomer polymerization in the presence of a catalyst including a solid catalyst component so as to obtain a component I; (2) performing monomer polymerization in the presence of the component I so as to obtain the component II, so that particles including a volatile component are produced; and (3) causing the particles to contact with an inert gas-containing stream so as to remove the volatile component from the particles.

6 Claims, 3 Drawing Sheets

METHOD FOR PRODUCING HETEROPHASIC PROPYLENE POLYMERIZATION MATERIAL PARTICLES

CROSS REFERENCE TO RELATED APPLICATIONS

This application claims priority to JP Patent Application No. 2019-067277, filed on Mar. 29, 2019, which is incorporated by reference herein.

BACKGROUND OF THE INVENTION

Field of the Invention

The present invention relates to a method for producing heterophasic propylene polymerization material particles.

Description of the Belated Art

Conventionally, methods for producing heterophasic propylene polymerization material particles, for example, by copolymerization of ethylene and propylene after homopolymerization of propylene or by the like step have been known. The heterophasic propylene polymerization material particles thus obtained contain a volatile component such as monomers or a solvent. To address this, JP-A-2013-256897 and JP-A-2015-71661 disclose drying methods for removing the volatile component from the particles by contacting the particles with inert gas.

SUMMARY OF THE INVENTION

However, these conventional methods would possibly result in high viscosity of the particles after removing the volatile component, thereby causing handling ability deterioration such as clogging in silos.

The present invention has been made in view of the above-described problem, and an object of the present invention is to provide a method for producing heterophasic propylene polymerization material particles, the method being capable of sufficiently removing the volatile component and down-regulating the increase of the viscosity of the particles after the removal of the volatile component.

According to the present invention, there is provided a method for producing heterophasic propylene polymerization material particles, the method including:

(1) performing monomer polymerization in the presence of a catalyst including a solid catalyst component so as to obtain a component (I) recited below;

(2) performing monomer polymerization in the presence of the component (I) so as to obtain a component (II), so that particles including a volatile component, the component (I), and the component (II) are produced; and (3) causing the particles to contact with an inert gas-containing stream so as to remove the volatile component from the particles.

The particles include the component (I) by 20 to 70 mass %, and the component (II) by 30 to 80 mass %.

The method satisfies the following Inequation (1):

$$19.5 \leq T^{1.12} \cdot t^{0.17} \cdot (C/100)^{0.61} / (d \cdot (0.85 \cdot P)^{1/3})^{0.13} \leq 51.4 \tag{1}$$

where T [° C.] is a temperature that the particles have when the particles contact with the inert gas-containing stream, t [h] is a contact time period in which the particles contact with the inert gas-containing stream, d [μm] is a median diameter that the solid catalyst component has at the time of start of step (1), P [g/g] is a mass of the particles per 1 g of the solid catalyst component, and C [mass %] is the content of the component (II) in the particles.

The components are as follows.

The component (I) including a component (I-1) and/or a component (I-2)

the component (I-1) being a propylene homopolymer the component (I-2) being a propylene copolymer including a propylene-derived structural unit and at least one type of olefin-derived structural unit selected from the group consisting of ethylene and C4 to C12 α-olefins, wherein a mass ratio of the at least one type of olefin-derived structural unit in the mass of the copolymer is less than 15 mass % the component (II) being a propylene copolymer including a propylene-derived structural unit and at least one type of olefin-derived structural unit selected from the group consisting of ethylene and C4 to C12 α-olefins, wherein a mass ratio of the at least one type of olefin-derived structural unit in the mass of the copolymer is in a range of 15 to 80 mass %

In addition, in the above-described method, counter currents of the particles and the inert gas-containing stream may be caused to contact with each other.

In addition, in the above-described method, the following Inequation (2) is further satisfied:

$$26.5 \leq T^{1.12} \cdot t^{0.17} \cdot (C/100)^{0.61} / (d \cdot (0.85 \cdot P)^{1/3})^{0.13} \tag{2}$$

The present invention provides a particle drying method or the like, which is capable of sufficiently removing the volatile component and down-regulating the increase of the viscosity of the particles after the removal of the volatile component.

DETAILED DESCRIPTION OF THE PREFERRED EMBODIMENTS

An embodiment of the present invention will be described herein.

(Heterophasic Propylene Polymerization Material Particles to be Dried)

Heterophasic propylene polymerization material particles to be dried in a present embodiment include a component (I), at least one type of a component (II), and a volatile component.

(Component (I))

The component (I) includes a component (I-1) and/or a component (I-2).

(Component (I-1))

The component (I-1) is a homopolymer of propylene including only a propylene-derived structural unit.

(Component (I-2))

The component (I-2) is a copolymer including a propylene-derived structural unit and at least one type of olefin-derived structural unit selected from the group consisting of ethylene and C4 to C12 α-olefins. A mass ratio of the at least one type of olefin-derived structural unit selected from the group consisting of ethylene and C4 to C12 α-olefins in the mass of the component (I-2) is less than 15 mass %.

The mass ratio of the at least one type of olefin-derived structural unit selected from the group consisting of ethylene and C4 to C12 α-olefins in the mass of the component (I-2) may be 0.01 mass % or more, preferably may be not less than 0.01 mass % but not more than 12 mass %, or more preferably not less than 3 mass % but not more than 10 mass %. In one embodiment, the mass ratio of the at least one type of olefin-derived structural unit selected from the group consisting of ethylene and C4 to C12 α-olefins in the mass of the component (I-2) preferably may be not less than 1 mass % but not more than 10 mass %, or more preferably not less than 1 mass % but not more than 3 mass %. A content of the propylene-derived structural unit in the mass of the component (I-2) may be 85 mass % or more, yet may be 90 mass or more.

(Component (II))

The component (II) is a copolymer including a propylene-derived structural unit and at least one type of olefin-derived structural unit selected from the group consisting of ethylene and C4 to C12 α-olefins. A mass ratio of the at least one type of olefin-derived structural unit in the mass of the component (II) is in a range of 15 to 80 mass %.

The mass ratio of the at least one type of olefin-derived structural unit in the mass of the component (II) may be preferably in a range of 20 to 70 mass %, or more preferably in a range of 25 to 60 mass %, or further preferably in a range of 30 to 50 mass %, or further preferably in a range of 40 to 50 mass %. The mass ratio of the propylene-derived structural unit in the mass of the component (II) may be not less than 20 mass % but not more than 85 mass %.

Examples of the components (I-2) and (II) include a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer, and a propylene-ethylene-1-decene copolymer. Preferable examples of the components (I-2) and (II) include the propylene-ethylene copolymer, the propylene-1-butene copolymer, and the propylene-ethylene-1-butene copolymer.

A limiting viscosity of the component (I) is preferably in a range of 0.1 to 10 dL/g, more preferably in a range of 0.6 to 3 dL/g, or further preferably in a range of 0.8 to 1.5 dL/g.

A limiting viscosity of the component (II) is preferably in a range of 0.1 to 10 dL/g, more preferably in a range of 1 to 5 dL/g, or further preferably in a range of 1.5 to 4 dL/g, or further preferably in a range of 2 to 3.5 dL/g, or further preferably in a range of 2 to 3 dL/g.

A heterophasic propylene polymerization material according to the present embodiment is such that a mass ratio of the whole component (I) in a mass of the heterophasic propylene polymerization material is 70 mass % or less, preferably 60 mass' or less, more preferably 55 mass or less, or further preferably 50 mass' or less. A lower limit of the mass ratio is 20 mass %, preferably 35 mass %.

A heterophasic propylene polymerization material according to the present embodiment is such that a mass ratio of the whole component (II) in a mass of the heterophasic propylene polymerization material is 30 mass % or more, preferably 40 mass % or more, more preferably 45 mass or more, or further preferably 50 mass % or more. An upper limit of the mass ratio is 90 mass %, preferably 65 mass %.

Examples of the C4 to C12 α-olefins selectable for the component (I-2) and the component (II) in the present embodiment include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene, and 1-butene, 1-hexene, and 1-octene are preferable, and 1-butene is more preferable.

Specific examples of the heterophasic propylene polymerization material include:

(i) a propylene polymerization material including the component (I-1) and the component (II);

(ii) a propylene polymerization material including the component (I-2) and the component (II); and (iii) a propylene polymerization material including the component (I-1), the component (I-2), and the component (II).

Examples of the heterophasic propylene polymerization material according to the present embodiment include (polypropylene)-(ethylene-propylene copolymer: the component (II)) heterophasic polymerization material, (propylene-ethylene copolymer: the component (I-2))-(ethylene-propylene copolymer: the component (II)) heterophasic polymerization material, (polypropylene)-(ethylene-propylene copolymer: component (I-2))-(ethylene-propylene copolymer: component (II)) heterophasic polymerization material, and the like.

(Volatile Component)

The volatile component includes a monomer(s) from the component (I) and/or the component (II), an oligomer(s) of the monomer(s), and/or a solvent (other than the monomers) that is used in a step of the production process such as the polymerization of the heterophasic propylene polymerization material.

Examples of the monomer(s) include propylene and the α-olefins described above.

Examples of the solvent other than the monomers include butane and hexane.

A content of the volatile component in the heterophasic propylene polymerization material particles before the drying may be in a range of 1000 to 10,000 ppm by mass.

A content of the volatile component in the heterophasic propylene polymerization material particles after the drying may be 100 ppm by mass or less.

An average particle diameter of the heterophasic propylene polymerization material particles is not particularly limited, but may be in a range of 1,000 to 5,000 μm, preferably in a range of 1,500 to 4,000 μm, or more preferably in a range of 2,000 to 3,500 μm, or further preferably in a range of 2,000 to 3,000 μm. Here, what is meant by the term "average particle diameter" is D50 of a volume-based particle size distribution measurable by a laser diffraction dry particle sire distribution measuring device.

(Production Method for Heterophasic Propylene Polymerization Material Particles)

One example of the method for producing the heterophasic propylene polymerization material particles will be described herein.

This method includes steps (1) to (3). In the following, these steps will be described in details.

[Step (1)]

Step (1) according to the present embodiment is a step of preparing the component (I), that is, the component (I-1) and/or the component (I-2) by polymerizing a monomer(s) in the presence of an olefin polymerization catalyst, the monomer(s) including propylene and, if necessary, an α-olefin(s). Examples of the olefin polymerization catalyst include Ziegler-Natta catalysts, metallocene catalysts, and the like. The Ziegler-Natta catalysts are preferable. Examples of the Ziegler-Natta catalysts include a catalyst including a solid catalyst component including a titanium atom and a magnesium atom. It is preferable that the solid catalyst component further include a halogen atom. The solid catalyst component may be prepared by causing a magnesium compound and a titanium compound to contact with each other. It is preferable that the titanium compound be a halogenated titanium compound.

Such a Ziegler-Natta catalyst may further include an organic aluminum compound and/or an electron donating compound, in addition to the solid catalyst component. The Ziegler-Natta catalyst may be preferably a catalyst including the solid catalyst component and the organic aluminum compound, or a catalyst including the solid catalyst component, the organic aluminum compound, and the electron donating compound.

In this Description, a median diameter (D50) of the solid catalyst component at a start of step (1) is a median diameter (D50) of a volume-based particle size distribution worked out by a laser diffraction/scattering method according to ISO 13320:2009. The median diameter of the solid catalyst component at the start of step (1) is preferably in a range of 40 to 80 μm, more preferably in a range of 50 to 70 μm.

The median diameter of the solid catalyst component can be adjusted by using the magnesium compound with another particle diameter, or the like.

In the present embodiment, the component (I-1) may be prepared by homopolymerization of propylene. The component (I-2) may be prepared by copolymerization of propylene and at least one type of olefin selected from the group consisting of ethylene and C4 to C12 α-olefins. For this purpose, a polymerization method may be, for example, bulk polymerization. The bulk polymerization is a method of performing polymerization by providing propylene monomer as a polymerization solvent, dispersing the olefin polymerization catalyst in the polymerization solvent, and generating a polymer in such a manner that the polymer will not dissolve in the polymerization solvent. The polymerization is carried out under such a polymerization temperature and polymerization pressure that the polymerization solvent is maintained in a liquid phase and the polymer thus generated will not dissolved in the polymerization solvent. The polymerization temperature is generally in a range of 30 to 100° C., or preferably in a range of 50 to 80° C. The polymerization pressure is generally in a range of ambient pressure to 10 MPa, or preferably in a range of 0.5 to 5 MPaG.

The bulk polymerization may employ a well-known polymerization reactor, which may be, for example, a stirring-tank type reactor, loop-shaped reactor, or the like described in JP-B-41-12916, JP-B-46-11670, or JP-B-47-42379.

Moreover, in order to adjust a molecular weight of the polymer, a chain transfer agent such as hydrogen may be used, for example.

In the present embodiment, the component (I-1) and/or the component (I-2) may be produced by sequential polymerization within a same reactor, or may be produced by continuous sequential polymerization in a multi-staged polymerization reactor including a plurality of reactors connected in series.

Step (1) may further include, after the bulk polymerization, performing gas-phase polymerization to produce the component (I).

In an initial phase of step (1), step (1) may include a so-called prepolymerization step of obtaining the component (I-1) and/or the component (I-2) by causing a small amount of an olefin to contact with the olefin polymerization catalyst. In a case where step (1) includes the prepolymerization step, the median diameter of the solid catalyst component is a particle diameter of the solid catalyst component before the prepolymerization.

[Step (2)]

Step (2) according to the present embodiment is a step of copolymerizing, in one or more gas-phase polymerization reactors, at least one type of olefin selected from the group consisting of ethylene and C4 to C12 α-olefins with propylene in the presence of the component (I), that is, the component (I-1) and/or the component (I-2) thus produced in step (1), thereby producing the component (II) described above. In this way, step (2) produces the heterophasic propylene polymerization material particles including the component (I), the component (II), and the volatile component.

In step (2), particles of the component (I) thus obtained in step (1) are continuously fed into the gas-phase polymerization reactor, and the copolymerization of the at least one type of olefin selected from the group consisting of ethylene and C4 to C12 α-olefins with propylene is carried out in a gas phase in the presence of the component (I).

A polymerization temperature for the gas-phase polymerization reactor(s) is generally in a range of 0 to 120° C., preferably in a range of 20 to 100° C., or more preferably in a range of 40 to 100° C. A polymerization pressure is in such a range that the olefin can exist in a gas phase within the gas-phase polymerization reactor, and is generally in a range of ambient pressure to 10 MPaG, preferably in a range of 0.2 to 8 MPaG, or more preferably in a range of 0.5 to 5 MPaG.

The copolymerization can be carried by using one or more, preferably two or more gas-phase polymerization reactors.

The gas-phase polymerization reactor(s) may be a well-known polymerization reactor, which may be a reactor described in JP-A-58-201802, JP-A-59-0126406, JP-A-2-233708, or the like, for example.

The copolymerization in step (2) is also polymerization utilizing the solid catalyst component within the particles. It is preferable that a mass P of the heterophasic propylene polymerization material particles finally obtained after step (2) (yield of the Steps (1) and (2)) be in a range of 20,000 to 90,000 g/g per 1 g of the solid catalyst component. It is more preferable that a mass P of the heterophasic propylene polymerization material particles finally obtained after step (2) (yield of the Steps (1) and (2)) be in a range of 25,000 to 70,000 g/g per 1 g of the solid catalyst component.

The mass P can be adjusted by the following methods. A longer residence time in step (1) and/or step (2) can increase the mass P. A greater polymerization temperature in step (1) and/or step (2) can increase the mass P. A greater polymerization pressure in step (1) and/or step (2) can increase the mass P.

(Step (3): Drying Step)

Thereafter, drying of the heterophasic propylene polymerization material particles thus obtained is carried out. Step (3) causes the heterophasic propylene polymerization material particles including the component (I), the component (II) and the volatile component to contact with an inert gas-containing stream, thereby removing the volatile component from the particles.

Here, the following Inequation (1) is satisfied:

$$19.5 \leq T^{1.12} \cdot t^{0.17} \cdot (C/100)^{0.61} / (d \cdot (0.85 \cdot P)^{1/3})^{0.13} \leq 51.4 \qquad (1)$$

where T [° C.] is a temperature that the particles have when the particles contact with the inert gas-containing stream, t [h] is a contact time period in which the particles contact with the inert gas-containing stream, d [μm] is a median diameter that the solid catalyst component has at the time of the start of step (1), P [gig] is the mass (yield) of the heterophasic propylene polymerization material particles per 1 g of the solid catalyst component, and C [mass %] is the content of the component (II) in the heterophasic propylene polymerization material particles.

Furthermore, the method according to the present embodiment may be arranged to satisfy the following Inequation (2):

$$26.5 \leq T^{1.12} \cdot t^{0.17} \cdot (C/100)^{0.61}/(d \cdot (0.85 \cdot P)^{1/3})^{0.13} \quad (2)$$

Examples of the inert gas include nitrogen and argon. The inert gas-containing stream may contain a gas other than the inert gas as appropriate for an amount of the volatile component in the heterophasic propylene polymerization material particles to be dried. Examples of such an inert gas-containing stream containing a gas other than the inert gas include air. A volume fraction of the inert gas in the inert gas-containing stream may be suitably 75% or more, or more suitably 78% or more. The volume fraction of the inert gas in the inert gas-containing stream may be 100%.

The temperature T, the contact time period t, the median diameter d that the solid catalyst component has at the time of the start of step (1), the mass P of the heterophasic propylene polymerization material particles per 1 g of the solid catalyst component, and the content C of the component (II) in the heterophasic propylene polymerization material particles can be set as appropriate within ranges in which the Inequation (1) is satisfied. The temperature T is typically in a range of 60 to 110° C., or preferably in a range of 60 to 90° C. The contact time period t is typically in a range of 0.5 to 5 hours, preferably in a range of 1 to 4.5 hours, or more preferably in a range of 1.5 to 4.0 hours. The median diameter d, the mass P, and the content C can be set as appropriate within the ranges described above.

The temperature T of the particles is a temperature when the particles are in contact with the inert gas-containing stream. The drying step is usually carried out within a drying device, as described below. In the drying step, the temperature of the particles within the drying device can be regarded as being equal to a temperature of the inert gas-containing stream in the drying device as long as the drying step is in a steady state. Thus, in this Description, T is an average of temperatures measured by at least 3 or more thermometers provided at different positions within the drying device.

T can be controlled by adjusting the temperature of the inert gas-containing stream that is to contact with the particles.

In a case where the drying step is carried out batch-wise, the contact time period t is a time period in which the particles are in contact with the inert gas-containing stream. In a case where the drying step is carried out continuously, a feeding rate of supplying the particles to the drying device is equal to a discharging rate of discharging the particles from the drying device. In a case where the drying step is carried out continuously, the contact time period can be defined by the following Equation (10):

$$\text{Contact time period } t \text{ (hours)} = \beta/\alpha \quad (10)$$

where α is the discharging rate of discharging the particles from the drying device (kg/hour), and β is a total mass of the particles that are being dried in the drying device (kg).

The particles may be caused to contact with the inert gas-containing stream in any ways. The inert gas-containing stream may be caused to contact with the particles as a static bed where the particles are present statically, or the inert gas-containing stream may be caused to contact with particles by forming a fluidized bed of the particles falling within the vessel by use of gravity by feeding the particles into a vessel from a top portion of the vessel continuously and removing the particles from a bottom portion of the vessel continuously, and causing the fluidized bed of the particles and the inert gas-containing stream to contact with each other. As an alternative, a fluid bed in which the particles are fluidized by the inert gas-containing stream may be formed.

Particularly, it is suitable to employ a fluidized bed in which the particles move downward and are caused to contact with a counter current of the inert gas-containing stream, that is, a method in which a downward fluidized bed of the particles is caused to contact with an upward flow of the inert gas-containing stream.

Figure 1:
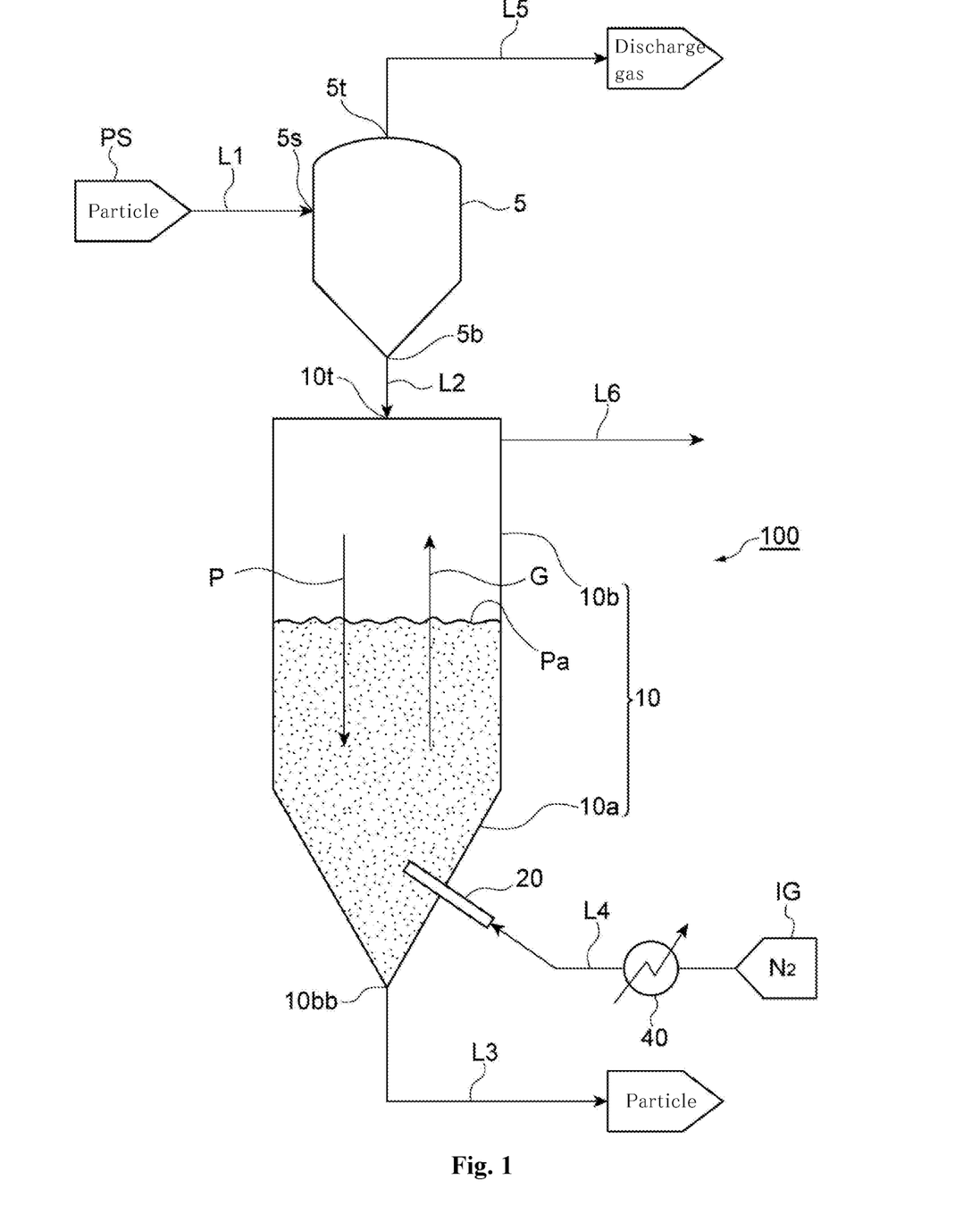
FIG. 1 is a schematic cross-sectional view illustrating one example of a drying device 100 described in an embodiment of the present invention.

More specifically, the drying may be carried out by using a drying device 100 as illustrated in FIG. 1.

The drying device 100 mainly includes a hopper 10 and a gas inlet pipe 20. The hopper 10 includes a cone portion 10a with an internal diameter tapered downward, and a cylindrical portion 10b connected onto the cone portion 10a. The gas inlet pipe 20 is configured to communicate an exterior and an interior of the cone portion 10a.

An upper end of the cylindrical portion 10b is closed and has an upper opening 10t. A particle-gas separating device 5 is provided at a position higher than the hopper 10, and the upper opening 10t of the hopper 10 is connected with a lower opening 5b of the particle-gas separating device 5 via a line L2.

A side inlet 5s of the particle-gas separating device 5 is connected with a particle supply source PS via a line L1. An upper outlet 5t of the particle-gas separating device 5 is connected with a line L5. A bottom outlet 10bb of the cone portion 10a of the hopper 10 is connected with a line L3.

The gas inlet pipe 20 is connected with an inert gas source IG via a line L4, and the line L4 is provided with a heat exchanger 40 for heating a gas to a predetermined temperature T.

Next, a drying method will be described in more details. The particles are supplied to the particle-gas separating device 5 via the line L1 from the particle supply source (for example, the gas-phase polymerization reactor) PS. In a case where the particle supply source PS is the gas-phase polymerization reactor, the monomer gas left unreacted is also introduced to the particle-gas separating device 5 via the line L1 together with the particles thus supplied. Therefore, the particle-gas separating device 5 separates the particles and the gas from each other.

The particles thus supplied are fed into the hopper 10 via the line L2 by use of gravity, thereby to form a particle bed Pa inside the hopper 10. Furthermore, the particles inside the hopper 10 are continuously discharged out via the line L3. On the other hand, an inert gas is continuously supplied to the particle bed Pa inside the hopper 10 via the gas inlet pipe 20, the inert gas having been adjusted to the temperature T via the line L4. It is so configured that an upper surface of the particle bed Pa inside the hopper 10 is positioned to be sufficiently higher than an upper end of the gas inlet pipe 20.

The particles inside the hopper 10 travel downwardly from a higher position as indicated by an arrow P, while the inert gas supplied from the gas inlet pipe 20 travels inside the hopper 10 upwardly from a lower position as indicated by an arrow G, 30 that counter currents of particles of the particle bed Pa and the inert gas contact with each other. This makes it possible to efficiently remove the volatile component of the particles into the inert gas.

The inert gas containing the volatile component is discharged via a gas-discharge line L6 provided at an upper end of the hopper 10.

(Effects)

With the drying method according to the present embodiment, the volatile component can be sufficiently removed and the increase of the viscosity of the particles after the removal of the volatile component can be down-regulated, because the drying conditions satisfy Inequation (1).

The present invention is not limited to the embodiments described above, and can be modified in various ways. For example, the drying device is not limited to one used in the embodiments described above.

EXAMPLES

[Preparation of the Heterophasic Propylene Polymerization Material Particles A]

(Synthesis of Olefin Polymerization Solid Catalyst Component E)

Inside of a 100-mL flask provided with a stirrer, a dropping funnel, and a thermometer was purged with nitrogen. Thereafter, 36.0 mL of toluene and 22.5 mL of titanium tetrachloride were supplied into the flask and stirred. After a temperature inside the flask was brought to 0° C., 1.88 g of magnesium ethozide was added therein at 0° C. four times with 30 min intervals, and a resultant thus obtained was stirred at 0° C. for 1.5 hours. After 0.60 mL of 2-ethoxymethyl-3,3-dimethylethylbutanoate was supplied into the flask, the temperature inside the flask was increased to 10° C. After that, a resultant thus obtained was stirred at 10° C. for 2 hours, and 9.8 mL of toluene was supplied therein. After that, the temperature inside the flask was increased at a rate of 1.2 K/min. When the temperature reached 60° C., 3.15 mL of 2-ethoxymethyl-3,3-dimethylethylbutanoate was supplied into the flask and the temperature was increased to 110° C. The components thus supplied were stirred at 110° C. for 3 hours. A mixture thus obtained was subject to solid-liquid separation, thereby obtaining a solid. The solid was washed at 100° C. with 56.3 mL of toluene three times.

After that, 38.3 mL of toluene was supplied to the solid thus washed, thereby forming a slurry. Into the slurry, 15.0 mL of titanium tetrachloride, and 0.75 mL of 2-ethozymethyl-3,3-dimethylethylbutanoate were supplied, thereby forming a mixture, which was stirred at 110° C. for 1 hour thereafter. Thereafter, the mixture thus stirred was subjected to solid-liquid separation and a solid thus obtained was washed at 60° C. three times with 56.3 mL of toluene and further washed at a room temperature three times with 56.3 mL of hexane. A solid thus washed was dried under reduce pressure, thereby obtaining an olefin polymerization solid catalyst component E. The solid catalyst component E had a titanium atom content of 2.47 mass %, an ethoxy group content of 0.55 mass %, an internal electron donner content of 12.8 mass %, and a median diameter of 67.0 μm, where the median diameter was measured by the laser diffraction/scattering method.

(Preparation of Heterophasic Propylene Polymerization Material Particles A)

(1-1a) Prepolymerization

Into a stainless steel (SUS)-made autoclave apparatus provided with a stirrer, n-hexane which had been sufficiently dehydrated and deaezated, 20 mmol/L of triethyl aluminum (hereinafter, referred to as "TEA"), 1.0 mmol/L of tert-butyl-n-propyldimethoxysilane were contained. Thereinto, 8 g/L of the solid catalyst component E thus prepared above was added, and 8 g/L of propylene was continuously added over about 30 min while a temperature of the autoclave apparatus was maintained at about 10° C. In this way, prepolymerization was carried out. Each of the amounts of TEA, tert-butyl-n-propyldimethoxysilane, the solid catalyst component E, and propylene was an amount per 1 L of n-hexane. Thereafter, a prepolymerization slurry thus obtained was transferred into an SUS316L-made autoclave apparatus provided with a stirrer. Liquid butane was added therein, thereby preparing 0.055 g/L of a slurry of a prepolymerization catalyst component.

(1-1b) Polymerization

In a device including a slurry polymerization reactor, a multi-staged gas-phase polymerization reactor and two fluid bed-type reactors, all of which were connected in series, a component (I-1) was produced by a polymerization step I described below and a polymerization step II described below, and the component (I-1) was transferred, without deactivating the polymer thus produced, to the reactors in the downstream where a component (II), which was an ethylene-propylene copolymer, was produced by a polymerization step III-1 and a polymerization step III-2.

[Polymerization Step I: Propylene Homopolymerization in the Slurry Polymerization Reactor]

By using the slurry polymerization reactor of a SUS304-made vessel type provided with a stirrer, propylene homopolymerization was carried out. That is, propylene, hydrogen, TEA, tert-butyl-n-propyldimethoxysilane, and the slurry of the prepolymerization catalyst component prepared in (1-1a) were continuously supplied into the slurry polymerization reactor, thereby carrying out a polymerization reaction to obtain a slurry containing polypropylene particles and liquid propylene. Reaction conditions were as below.

Polymerization temperature: 50° C.

Stirring speed: 150 rpm

Amount of hydrogen supplied with respect to amount of propylene supplied: 2.0 NL/kg Amount of TEA supplied with respect to amount of polypropylene produced in polymerization step I: 5790 ppm Amount of tert-butyl-n-propyldimethoxysilane supplied with respect to the amount of polypropylene produced in polymerization step I: 177 ppm Amount of the solid catalyst component in the slurry of prepolymerization catalyst component supplied with respect to the amount of polypropylene produced in polymerization step I: 0.00061 g/g Polymerization pressure: 2.70 MPa (gauge pressure)

[Polymerization Step II: Propylene Homopolymerization in the Multi-Staged Gas-Phase Polymerization Reactor]

A multi-staged gas-phase polymerization reactor was provided, which had 6 stages of reaction regions aligned vertically. An upmost stage among the 6 stages was a fluid bed and remaining 5 stages were spouted beds.

The slurry containing the polypropylene particles and liquid propylene was continuously supplied from the slurry polymerization reactor to a fluid bed that is an upmost stage of the multi-staged gas-phase polymerization reactor without being deactivated.

The transfer of the polypropylene particles from one stage to another within the multi-staged gas-phase polymerization reactor was carried out by a double-valve method. This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the polypropylene particles are moved into a space between the on-off valves from the upstream reaction region and retained in the space, and after the upstream on-off valve is closed thereafter, the downstream on-off valve is opened, so that the polypropylene particles are moved into the downstream reaction region.

Propylene and hydrogen were continuously supplied from a lower portion of the multi-staged gas-phase polymerization reactor configured as above. In this way, the propylene homopolymerization was further carried out by forming a fluid bed or a spouted bed in each of the reaction regions, and controlling the supply amounts of the propylene and hydrogen and purging extra gas in such a way as to maintain a constant gas composition and a constant pressure therein. Reaction conditions were as below.

Polymerization Temperature: 70° C.
Polymerization pressure: 2.00 MPa (gauge pressure)

A concentration ratio of the gases inside the multi-staged gas-phase polymerization reactor was such that (hydrogen/(hydrogen+propylene))=6.9 mol %.

[Polymerization Step III-1: Ethylene-Propylene Copolymerization in a Fluid Bed-Type Reactor (1)]

The polypropylene particles discharged from the multi-staged gas-phase polymerization reactor were continuously supplied into the fluid bed-type reactor (1). The fluid bed-type reactor (1) for the polymerization step III-1 had one fluid-bed reaction region in a vertical direction and a transfer scheme for the polypropylene particles from the multi-staged gas-phase polymerization reactor into the fluid bed-type reactor (1) was the double-valve method described above.

The polymerization of propylene and ethylene was carried out in the presence of the polypropylene particles by continuously supplying propylene, ethylene, and hydrogen in the fluid bed-type reactor (1), and controlling the gas supply amounts and purging extra gas in such a way as to maintain a constant gas composition and a constant pressure therein. Reaction conditions were as below.

Polymerization Temperature: 70° C.
Polymerization pressure: 1.96 MPa (gauge pressure)

A concentration ratio of the gases inside the fluid bed-type reactor (1) was such that ethylene/(hydrogen+propylene+ethylene; =41.3 mol %, and hydrogen/(hydrogen+propylene+ethylene)=2.32 mol %.

[Polymerization Step III-2: Ethylene-Propylene Copolymerization in the Fluid Bed-Type Reactor (2)]

The polypropylene particles discharged from the fluid bed-type reactor (1) in the polymerization step III-1 were continuously supplied into the fluid bed-type reactor (2) in the polymerization step III-2 provided in further downstream. The fluid bed-type reactor (2) in the polymerization step III-2 had one fluid-bed reaction region in the vertical direction and a transfer scheme for the polypropylene particles from the fluid bed-type reactor (1) of the polymerization step III-1 into the fluid bed-type reactor (2) of the polymerization step III-2 was the double-valve method described above.

The copolymerization of the propylene and ethylene was carried out as in the polymerization step III-1 apart from the following conditions, thereby obtaining heterophasic propylene polymerization material particles A.

Polymerization temperature: 70° C.
Polymerization pressure: 1.92 MPa (Gauge pressure)

A concentration ratio of the gases inside the fluid bed-type reactor (2) was such that ethylene/(hydrogen+propylene+ethylene)=31.3 mol %, and hydrogen/(hydrogen+propylene+ethylene)=1.77 mol %.

A mass P of the heterophasic propylene polymerization material particles A per 1 g of the solid catalyst component was 68734 g/g.

Analysis results of the heterophasic propylene polymerization material particles A thus obtained are shown on Table 1.

TABLE 1

| | Unit | Heterophasic propylene polymerization material particles | | |
|---|---|---|---|---|
| | | A | B | C |
| Median disaster d of solid catalyst component before polymerization | μm | 67 | 67 | 29 |
| Average particle diameter of heterophasic propylene polymerization material particles | μm | 2814 | 2116 | 1192 |
| Content C of component (II) in heterophasic propylene polymerization material particles | mass % | 54.6 | 39.3 | 20.5 |
| Mass P of heterophasic propylene polymerization material particles per 1 g of solid catalyst component | [g/g] | 68734 | 39209 | 38980 |
| $[\eta]_I$ | dL/g | 1.00 | 0.88 | 1.06 |
| $[\eta]_T$ | dL/g | 1.59 | 1.58 | 1.40 |
| $(C'2)_T$ | mass % | 22.5 | 18.3 | 7.6 |
| $[\eta]_{II}$ | dL/g | 2.08 | 2.66 | 2.72 |
| $(C'2)_{II}$ | mass % | 41.2 | 46.5 | 37.1 |

Here, $[\eta]_T$ is a limiting viscosity of the whole heterophasic propylene polymerization material, $(C'2)_T$ is an ethylene unit content (mass %) in the whole heterophasic propylene polymerization material, $[\eta]_I$ is a limiting viscosity of the component (I-1) or a limiting viscosity of the component (I-2), $[\eta]_{II}$ is a limiting viscosity of the component (II), $(C'2)_{I-2}$ is an ethylene unit content (mass %) in the component (I-2) and $(C'2)_{XI}$ is an ethylene unit content (mass %) in the component (II).

An average particle diameter of the heterophasic propylene polymerization material particles A was measured as below.

The average particle diameter of the heterophasic propylene polymerization material particles A was D50 of the volume-based particle size distribution measured by using a laser diffraction dry particle size distribution measuring device of HELOS.

A content C of the component (II) in the heterophasic propylene polymerization material thus obtained was worked out by measuring crystal melting heat quantities of the component (I-1) or component (I-2) and the whole heterophasic propylene polymerization material, and calculating the following Equation. The crystal melting heat quantities were measured by differential scanning calorimetry (DSC).

$$C=100\{1-(\Delta Hf)_T/(\Delta Hf)_P\}$$

where $(\Delta Hf)_T$ is the melting heat quantity (J/g) of the whole heterophasic propylene polymerization material, and $(\Delta Hf)_P$ is the melting heat quantity (J/g) of the component (I-1) or component (I-2).

The limiting viscosity $[\eta]_T$ of the heterophasic propylene polymerization material (unit: dl/g) and the limiting viscosity $[\eta]_I$ of the component (I-1) (unit: dl/g) were worked out as below.

Three samples were prepared by dissolving the polymer in 1,2,3,4-tetrahydronaphthalene solvents respectively to attain predetermined concentrations. The polymer concentrations of the samples were 0.1 g/dl, 0.2 g/dl, and 0.5 g/dl, respectively. Under temperature of 135° C., reduced viscosities of these samples were measured by using an Ubbelohde viscometer. According to a calculation method described on Page 491 of "Kobunshi yoeki, Kobunshi Jikkengaku 11" ("Polymer solution, polymer experiments 11") (1932, published by KYORITSU SHUPPAN CO., LTD.), the reduced viscosities were plotted against the concentrations, and the limiting viscosity was worked out by extrapolating the concentration to zero.

An ethylene unit content $(C'2)_T$ in the heterophasic propylene polymerization material (unit: mass %) and an ethylene unit content $(C'2)_{I-2}$ in the component (I-2) were worked out as below.

An ethylene unit content was worked out by the IR spectroscopic method according to the IR spectroscopic measurement described on Page 619 of "KYobunshi handbook" ("Polymer handbook") (1995, published by KINOKUNIYA COMPANY LTD.). Here, what is meant by the "ethylene unit" is a structural unit derived from ethylene.

$[\eta]_{XI}$ and $(C'2)_{XI}$ were worked out from the content C of the component (II) in the heterophasic propylene polymerization material, $[\eta]_T$, $(C'2)_T$, $[\eta]_I$ and $(C'2)_{I-2}$.

$$[\eta]_{II} = \{100[\eta]_T - [\eta]_I(100-C)\}/C$$

$$(C'2)_{II} = \{100(C'2)_T - (C'2)_{I-2}(100-C)\}/C$$

Here, when the heterophasic propylene polymerization material does not comprise component (I-2), it is substituted 0 for $(C'2)_{I-2}$.

The median diameter (D50) of the solid catalyst component E before the prepolymerization was worked out as below.

According to ISO 13320: 2009, the median diameter of the solid catalyst component was analyzed by the laser diffraction/scattering method. The measure device used was a laser diffraction particle size distribution measuring device (Mastersizer 3000 made by Malvern Panalytical Ltd.), and the diffractions were so set that the diffraction of toluene was 1.49 and that of the solid catalyst component was 1.53-0.11. A toluene solvent, which had been dehydrated in advance with aluminum or the like, was introduced in a dispersion device (Hydro MV) with a nitrogen-sealed opening, thereby filling, with the solvent, an inside of a circulation system including a measurement cell. A particle size was measured in such a way that a stirring speed was set to 2,000 rpm and a powder sample was introduced with a scattering intensity in a range of 3 to 10% into the device without ultrasonic dispersion treatment while the solvent inside the measurement cell was circulated. From a particle size volume-based distribution chart (chart) thus obtained, the median diameter (D50) was worked out. The samples were handled in such a manner that the samples would not contact with atmospheric air and moisture, and were not pretreated.

[Preparation of the Heterophasic Propylene Polymerization Material Particles B]

(1-1a) Prepolymerization

Into an SUS-made autoclave apparatus provided with a stirrer, n-hexane which had been sufficiently dehydrated and deaerated, 20 mmol/L of TEA, 2.0 mmol/L of tert-butyl-n-propyldimethoxysilane were contained. Thereinto, 5 g/L of the solid catalyst component E same as that used for preparing the heterophasic propylene polymerization material particles A was added, and 26 g/L of propylene was continuously added over about 30 min while a temperature of the autoclave apparatus was maintained at about 10° C. In this way, prepolymerization was carried out. Thereafter, a prepolymerization slurry thus obtained was transferred into an SUS316L-made autoclave apparatus provided with a stirrer. Liquid butane was added therein, thereby preparing 0.028 g/L of a slurry of a prepolymerization catalyst component.

(1-1b) Polymerization

In a device including a slurry polymerization reactor, a multi-staged gas-phase polymerization reactor and two fluid bed-type reactors, all of which were connected in series, a component (I-1) was produced by a polymerization step I described below and a polymerization step II described below, and the component (I-1) was transferred, without deactivating the polymer thus produced, to the reactors in the downstream where a component (II), which was an ethylene-propylene copolymer, was produced by a polymerization step III-1 and a polymerization step III-2.

[Polymerization Step I: Propylene Homopolymerization in the Slurry Polymerization Reactor]

By using the slurry polymerization reactor of a SUS304-made vessel type provided with a stirrer, propylene homopolymerization was carried out. That is, propylene, hydrogen, TEA, tert-butyl-n-propyldimethoxysilane, and the slurry of the prepolymerization catalyst component prepared in (1-1a) were continuously supplied into the slurry polymerization reactor, thereby carrying out a polymerization reaction to obtain a slurry containing polypropylene particles and liquid propylene. Reaction conditions were as below.

Polymerization temperature: 50° C.
Stirring speed: 150 rpm
Amount of hydrogen supplied with respect to amount of propylene supplied: 2.8 NL/kg
Amount of TEA supplied with respect to amount of polypropylene produced in polymerization step I: 8260 ppm
Amount of tert-butyl-n-propyldimethoxysilane supplied with respect to the amount of polypropylene produced in polymerization step I: 2680 ppm
Amount of the slurry of prepolymerization catalyst component supplied with respect to the amount of polypropylene produced in polymerization step I (Conversion of polymerization catalyst components): 0.00070 g/g
Polymerization pressure: 2.68 MPa (gauge pressure)

[Polymerization Step II: Propylene Homopolymerization in the Multi-Staged Gas-Phase Polymerization Reactor]

A multi-staged gas-phase polymerization reactor was provided, which had 6 stages of reaction regions aligned vertically. An upmost stage among the 6 stages was a fluid bed and remaining 5 stages were spouted beds.

The slurry containing the polypropylene particles and liquid propylene was continuously supplied from the slurry polymerization reactor to a fluid bed that is an upmost stage of the multi-staged gas-phase polymerization reactor without being deactivated.

The transfer of the polypropylene particles from one stage to another within the multi-staged gas-phase polymerization reactor was carried out by a double-valve method. This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the polypropylene particles are moved into a space between the on-off valves from the upstream reaction region and retained in the space, and after the upstream on-off valve is closed thereafter, the downstream on-off valve is opened, so that the polypropylene particles are moved into the downstream reaction region.

Propylene and hydrogen were continuously supplied from a lower portion of the multi-staged gas-phase polymerization reactor configured as above. In this way, the propylene homopolymerization was further carried out by forming a fluid bed or a spouted bed in each of the reaction regions, and controlling the supply amounts of the propylene and hydrogen and purging extra gas in such a way as to maintain a constant gas composition and a constant pressure therein. Reaction conditions were as below.

Polymerization Temperature: 70° C.
Polymerization pressure: 2.00 MPa (gauge pressure)
A concentration ratio of the gases inside the multi-staged gas-phase polymerization reactor was such that (hydrogen/(hydrogen+propylene))=10.1 mol %.

[Polymerization Step III-1: Ethylene-Propylene Copolymerization in a Fluid Bed-Type Reactor (1)]

The polypropylene particles discharged from the multi-staged gas-phase polymerization reactor were continuously supplied into the fluid bed-type reactor (1). The fluid bed-type reactor (1) for the polymerization step III-1 had one fluid-bed reaction region in a vertical direction and a transfer scheme for the polypropylene particles from the multi-staged gas-phase polymerization reactor into the fluid bed-type reactor (1) was the double-valve method described above.

The copolymerization of propylene and ethylene was carried out in the presence of the polypropylene particles by continuously supplying propylene, ethylene, and hydrogen in the fluid bed-type reactor (1), and controlling the gas supply amounts and purging extra gas in such a way as to maintain a constant gas composition and a constant pressure therein. Reaction conditions were as below.

Polymerization Temperature: 70° C.
Polymerization pressure: 1.97 MPa (gauge pressure)
A concentration ratio of the gases inside the fluid bed-type reactor (1) was such that ethylene/(hydrogen+propylene+ethylene)=39.3 mol %, and hydrogen/(hydrogen+propylene+ethylene)=2.58 mol.

[Polymerization Step III-2: Ethylene-Propylene Copolymerization in the Fluid Bed-Type Reactor (2)]

The polypropylene particles discharged from the fluid bed-type reactor (1) in the polymerization step III-1 were continuously supplied into the fluid bed-type reactor (2) in the polymerization step III-2 provided in further downstream. The fluid bed-type reactor (2) in the polymerization step III-2 had one fluid-bed reaction region in the vertical direction and a transfer scheme for the polypropylene particles from the fluid bed-type reactor (1) of the polymerization step III-1 into the fluid bed-type reactor (2) of the polymerization step III-2 was the double-valve method described above.

The copolymerization of the propylene and ethylene was carried out as in the polymerization step III-1 apart from the following conditions, thereby obtaining heterophasic propylene polymerization material particles E.

Polymerization Temperature: 70° C.
Polymerization pressure: 1.93 MPa (gauge pressure)
A concentration ratio of the gases inside the fluid bed-type reactor (2) was such that ethylene/(hydrogen+propylene+ethylene)=39.3 mol %, and hydrogen/(hydrogen+propylene+ethylene)=2.52 mol.

For evaluating volatile component removing ability and discharging ability, the heterophasic propylene polymerization material particles B thus obtained were sieved with a stainless-made sieve of a sieve diameter of 2360 mm (JIS STANDAPD SIEVE, MANABE KOGYO). Analytical results of the particles thus sieved are shown on Table 1. The analytical methods are identical with those for the heterophasic propylene polymerization material particles A.

A mass P of the heterophasic propylene polymerization material particles per 1 g of the solid catalyst component was 39309 g/g.

[Preparation of the Heterophasic Propylene Polymerization Material Particles C]

(Synthesis of Olefin Polymerization Solid Catalyst Component F)

After an inside of a SUS-made reactor vessel having an internal volume of 200 L and provided with a stirrer was purged with nitrogen, 80 L of hexane, 6.55 mol of tetrabutoxy titanium, 2.8 mol of diisobutyl phthalate, 98.9 mol of tetrabutozy silane were supplied therein and stirred to prepare a homogenous solution thereof. After that, 51 L of diisobutyl ether solution containing butyl magnesium chloride by 2.1 mol/L was gradually dropped therein over 5 hours while a temperature inside the reactor vessel was maintained at 5° C. After the dropping, a mixture thus obtained was further stirred at a room temperature for 1 hour, and subjected to solid-liquid separation at the room temperature, and a solid thus obtained was washed three times with 70 L of toluene. After the toluene was removed to attain a slurry concentration of 0.6 kg/L thereafter, a mixture of 8.9 mol of n-butyl ether and 274 mol of titanium tetrachloride was added therein and further 20.8 mol of phthaloyl chloride was added therein and the mixture was reacted at 110° C. for 3 hours. After the reaction, a resultant was washed twice with toluene of 95° C. After a slurry thus obtained was adjusted to a slurry concentration of 0.6 kg/L, 3.13 mol of diisobutyl phthalate, 8.9 mol of n-dibutyl ether, and 137 mol of titanium tetrachloride were added therein, and a mixture thus obtained was reacted at 105° C. for 1 hour. After the reaction, a resultant was subjected to solid-liquid separation at 105° C., and a solid thus obtained was washed twice with 90 L of toluene of 95° C. After the slurry concentration was adjusted to 0.6 kg/L, 8.9 mol of n-dibutyl ether and 137 mol of titanium tetrachloride were added therein, and a mixture thus obtained was reacted at 95° C. for 1 hour. After that reaction, a resultant was subjected to solid-liquid separation at 95° C., and a solid thus obtained was washed at 95° C. three times with 90 L of toluene. After the slurry concentration was adjusted to 0.6 kg/L, 8.9 mol of n-dibutyl ether and 137 mol of titanium tetrachloride were added therein, and a mixture thus obtained was reacted at 95° C. for 1 hour. After the end of the reaction, a resultant was subjected to solid-liquid separation at 95° C., and a solid thus obtained was washed at 95° C. three times with 90 L of toluene, and further washed three times with 90 L of hexane. After that, a resultant was dried under reduced pressure, thereby obtaining 11.0 kg of a solid catalyst component F. The solid catalyst component F had a good particle form containing titanium atoms by 1.89 mass %, magnesium atoms by 20 mass %, phthalate ester by 8.6 mass %, ethoxy group by 0.05 mass %, and butoxy group by 0.21 mass % without fine powder. A median diameter of the solid catalyst component F was 29.0 μm, which was measured by the laser diffraction/scattering method.

(Preparation of Heterophasic Propylene Polymerization Material Particles C)

(1-1a) Prepolymerization

Into an SUS-made autoclave apparatus provided with a stirrer, liquid butane, 25 mmol/L of TEA, 3.3 mmol/L of tert-butyl normal propyl dimethoxysilane, which had been sufficiently dehydrated and deaerated, were contained.

Thereinto, 15 g/L of the solid catalyst component F was added, and 53 g/L of propylene was continuously added over about 10 min while a temperature of the autoclave apparatus was maintained at about 25° C. In this way, prepolymerization was carried out. Thereafter, a prepolymerization slurry thus obtained was transferred into an SUS316L-made autoclave apparatus provided with a stirrer. Liquid butane was added therein, thereby preparing 3.8 g/L of a slurry of a prepolymerization catalyst component.

(1-1b) Polymerization

In a device including a slurry polymerization reactor and fluid bed-type reactors, which were connected in series, a component (I-1) was produced by a polymerization step I described below, a polymerization step II-1 described below, and a polymerization step II-2 described below, and the component (I-1) was transferred, without deactivating the polymer thus produced, to the reactors in the downstream where a component (II), which was an ethylene-propylene copolymer, was produced by a polymerization step III described below.

[Polymerization Step I: Propylene Homopolymerization in the Slurry Polymerization Reactor]

By using the slurry polymerization reactor of a SUS304-made loop type, propylene homopolymerization was carried out. That is, propylene, hydrogen, TEA, tert-butyl n-propyl dimethozysilane, and the slurry of the prepolymerization catalyst component prepared in (1-1a) were continuously supplied into the slurry polymerization reactor, thereby carrying out a polymerization reaction to obtain a slurry containing polypropylene particles and liquid propylene. Reaction conditions were as below.

Polymerization temperature: 70° C.

Amount of hydrogen supplied with respect to amount of propylene supplied: 4.2 NL/kg Amount of TEA supplied with respect to amount of polypropylene produced in polymerization step I: 330 ppm Amount of tert-butyl n-propyl dimethozysilane supplied with respect to the amount of polypropylene produced in polymerization step I: 90 ppm Amount of the slurry of prepolymerization catalyst component supplied with respect to the amount of polypropylene produced in polymerization step I (Conversion of polymerization catalyst components): 0.00007 g/g Polymerization pressure: 4.50 MPa (gauge pressure)

[Polymerization Step II-1: Propylene Homopolymerization in Fluid Bed-Type Reactor]

From the slurry polymerization reactor to the fluid bed-type reactor, a slurry containing the polypropylene particles and the liquid propylene was continuously supplied without being deactivated.

From a lower portion of the fluid bed-type reactor, propylene and hydrogen were continuously supplied. In this way, a fluid bed was formed and propylene homopolymerization was further carried out by controlling supply amounts of propylene and hydrogen and purging extra gas in such a way as to maintain a constant gas composition and a constant pressure therein. Reaction conditions were as below.

Polymerization Temperature: 80° C.

Polymerization pressure: 2.10 MPa (gauge pressure)

A concentration ratio of the gases inside the reactor was such that (hydrogen/(hydzogen+propylene))=7.5 mol %.

[Polymerization Step II-2: Propylene Homopolymerization in Fluid Bed-Type Reactor]

The polypropylene particles discharged from the fluid bed-type reactor for the polymerization step II-1 were continuously supplied to the fluid bed-type reactor for polymerization step II-2.

The propylene polymerization was carried out in the presence of the polypropylene particles by continuously supplying propylene and hydrogen in the fluid bed-type reactor, and controlling the gas supply amounts and purging extra gas in such a way as to maintain a constant gas composition and a constant pressure therein. Reaction conditions were as below.

Polymerization temperature: 80° C.

Polymerization pressure: 1.70 MPa (gauge pressure)

A concentration ratio of the gases inside the reactor was such that (hydrogen/(hydrogen+propylene))=7.5 mol %.

[Polymerization Step III: Ethylene-Propylene Copolymerization in Fluid Bed-Type Reactor]

The polypropylene particles discharged from the fluid bed-type reactor for the polymerization step II-2 were continuously supplied to the fluid bed-type reactor positioned in further downstream.

The copolymerization of propylene and ethylene was carried out in the presence of the polypropylene particles by continuously supplying propylene, ethylene, and hydrogen in the fluid bed-type reactor, and controlling the gas supply amounts and purging extra gas in such a way as to maintain a constant gas composition and a constant pressure therein, and the heterophasic propylene polymerization material particles C was obtained. Reaction conditions were as below.

Polymerization Temperature: 70° C.

Polymerization pressure: 1.35 MPa (gauge pressure)

A concentration ratio of the gases inside the reactor was such that ethylene/(hydrogen+propylene+ethylene)=31.0 mol %, and hydrogen/(hydrogen+propylene+ethylene) 2.10 mol %.

A mass P of the heterophasic propylene polymerization material particles per 1 g of the solid catalyst component was 38980 g/g.

Analytical results of the heterophasic propylene polymerization material particles C thus obtained are shown on Table 1. The analytical methods are identical with those for the heterophasic propylene polymerization material particles A.

[Preparation of the Heterophasic Propylene Polymerization Material Particles D]

(1-1a) Prepolymerization

Into an SUS-made autoclave apparatus provided with a stirrer, n-hexane which had been sufficiently dehydrated and deaerated, 30 mmol/L of TEA, 3.0 mmol/L of tert-butyl-n-propyldimethoxysilane were contained. Thereinto, 12 g/L of the solid catalyst component E same as that used for preparing the heterophasic propylene polymerization material particles A was added, and 12 g/L of propylene was continuously added over about 30 min while a temperature of the autoclave apparatus was maintained at about 10° C. In this way, prepolymerization was carried out. Thereafter, a prepolymerization slurry thus obtained was transferred into an SUS316L-made autoclave apparatus provided with a stirrer. Liquid butane was added therein, thereby preparing 0.094 g/L of a slurry of a prepolymerization catalyst component.

(1-1b) Polymerization

In a device including a slurry polymerization reactor, a multi-staged gas-phase polymerization reactor and a fluid bed-type reactor, all of which were connected in series, a component (I-1) was produced by a polymerization step I described below and a polymerization step II described below, and the component (I-1) was transferred, without deactivating the polymer thus produced, to the reactors in the downstream where a component (II), which was an ethylene-propylene copolymer, was produced by a polymerization step III.

[Polymerization Step I: Propylene Homopolymerization in the Slurry Polymerization Reactor]

By using the slurry polymerization reactor of a SUS304-made vessel type provided with a stirrer, propylene homopolymerization was carried out. That is, propylene, hydrogen, TEA, tert-butyl-n-propyldimethoxysilane, and the slurry of the prepolymerization catalyst component prepared in (1-1a) were continuously supplied into the slurry polymerization reactor, thereby carrying out a polymerization reaction to obtain a slurry containing polypropylene particles and liquid propylene. Reaction conditions were as below.

Polymerization temperature: 50° C.
Stirring speed: 150 rpm
Amount of hydrogen supplied with respect to amount of propylene supplied: 2.8 NL/kg
Amount of TEA supplied with respect to amount of polypropylene produced in polymerization step I: 5336 ppm
Amount of tert-butyl-n-propyldimethoxysilane supplied with respect to the amount of polypropylene produced in polymerization step I: 1835 ppm
Amount of the slurry of prepolymerization catalyst component supplied with respect to the amount of polypropylene produced in polymerization step I (Conversion of polymerization catalyst components): 0.00134 g/g
Polymerization pressure: 3.50 MPa (gauge pressure)

[Polymerization Step II: Propylene Homopolymerization in the Multi-Staged Gas-Phase Polymerization Reactor]

A multi-staged gas-phase polymerization reactor was provided, which had 6 stages of reaction regions aligned vertically. An upmost stage among the 6 stages was a fluid bed and remaining 5 stages were spouted beds.

The slurry containing the polypropylene particles and liquid propylene was continuously supplied from the slurry polymerization reactor to a fluid bed that is an upmost stage of the multi-staged gas-phase polymerization reactor without being deactivated.

The transfer of the polypropylene particles from one stage to another within the multi-staged gas-phase polymerization reactor was carried out by a double-valve method. This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the polypropylene particles are moved into a space between the on-off valves from the upstream reaction region and retained in the space, and after the upstream on-off valve is closed thereafter, the downstream on-off valve is opened, so that the polypropylene particles are moved into the downstream reaction region.

Propylene and hydrogen were continuously supplied from a lower portion of the multi-staged gas-phase polymerization reactor configured as above. In this way, the propylene homopolymerization was further carried out by forming a fluid bed or a spouted bed in each of the reaction regions, and controlling the supply amounts of the propylene and hydrogen and purging extra gas in such a way as to maintain a constant gas composition and a constant pressure therein. Reaction conditions were as below.

Polymerization Temperature: 59° C.
Polymerization pressure: 1.80 MPa (gauge pressure)

A concentration ratio of the gases inside the multi-staged gas-phase polymerization reactor was such that (hydrogen/(hydrogen+propylene))=10.2 mol.

[Polymerization Step III: Ethylene-Propylene Copolymerization in a Fluid Bed-Type Reactor (1)]

The polypropylene particles discharged from the multi-staged gas-phase polymerization reactor were continuously supplied into the fluid bed-type reactor (1). The fluid bed-type reactor (1) for the polymerization step III had one fluid-bed reaction region in a vertical direction and a transfer scheme for the polypropylene particles from the multi-staged gas-phase polymerization reactor into the fluid bed-type reactor (1) was the double-valve method described above.

The copolymerization of propylene and ethylene was carried out in the presence of the polypropylene particles by continuously supplying propylene, ethylene, and hydrogen in the fluid bed-type reactor (1), and controlling the gas supply amounts and purging extra gas in such a way as to maintain a constant gas composition and a constant pressure therein, thereby obtaining heterophasic propylene polymerization material particles D. Reaction conditions were as below.

Polymerization Temperature: 70° C.
Polymerization pressure: 1.75 MPa (gauge pressure)

A concentration ratio of the gases inside the fluid bed-type reactor (1) was such that ethylene/(hydrogen+propylene+ethylene)=40.4 mol %, and hydrogen/(hydrogen+propylene+ethylene)=3.13 mol %.

A mass P of the heterophasic propylene polymerization material particles per 1 g of the solid catalyst component was 27041 g/g.

Analysis results of the heterophasic propylene polymerization material particles D thus obtained are shown on Table 4. The analytical methods are identical with those for the heterophasic propylene polymerization material particles A.

TABLE 4

| | Unit | Heterophasic propylene polymerization material particles | |
|---|---|---|---|
| | | D | F |
| Median diameter d of solid catalyst component before polymerization | μm | 58 | 62 |
| Average particle diameter of heterophasic propylene polymerization material particles | μm | 1974 | 2085 |
| Content C of component (II) in heterophasic propylene polymerization material particles | mass % | 50.9 | 44.5 |
| Mass P of heterophasic propylene polymerization material particles per 1 g of solid catalyst component | [g/g] | 27041 | 41776 |
| $[\eta]_I$ | dL/g | 0.92 | 1.21 |
| $[\eta]_T$ | dL/g | 1.94 | 1.82 |
| $(C'2)_{I-2}$ | mass % | — | 1.7 |
| $(C'2)_T$ | mass % | 22.7 | 19.9 |
| $[\eta]_{II}$ | dL/g | 2.93 | 2.58 |
| $(C'2)_{II}$ | mass % | 44.6 | 42.6 |

[Preparation of the Heterophasic Propylene Polymerization Material Particles F]

(1-1a) Prepolymerization

Into an SUS-made autoclave apparatus provided with a stirrer, n-hexane which had been sufficiently dehydrated and deaerated, 20 mmol/L of TEA, 2.0 mmol/L of tert-butyl-n-propyldimethoxysilane were contained. Thereinto, 7 g/L of the solid catalyst component E same as that used for preparing the heterophasic propylene polymerization material particles A was added, and 7 g/L of propylene was continuously added over about 30 min while a temperature of the autoclave apparatus was maintained at about 10° C. In this way, prepolymerization was carried out. Thereafter, a prepolymerization slurry thus obtained was transferred into an SUS316L-made autoclave apparatus provided with a stirrer. Liquid butane was added therein, thereby preparing 0.060 g/L of a slurry of a prepolymerization catalyst component.

(1-1b) Polymerization

In a device including a slurry polymerization reactor, a multi-staged gas-phase polymerization reactor and a fluid bed-type reactor, all of which were connected in series, a component (I-2) was produced by a polymerization step I described below and a polymerization step II described below, and the component (I-2) was transferred, without deactivating the polymer thus produced, to the reactors in the downstream where a component (II), which was an ethylene-propylene copolymer, was produced by a polymerization step III.

[Polymerization Step I: Ethylene-Propylene Copolymerization in the Slurry Polymerization Reactor]

By using the slurry polymerization reactor of a SUS304-made vessel type provided with a stirrer, ethylene-propylene copolymerization was carried out. That is, propylene, ethylene, hydrogen, TEA, tert-butyl-n-propyldimethoxysilane, and the slurry of the prepolymerization catalyst component prepared in (1-1a) were continuously supplied into the slurry polymerization reactor, thereby carrying out a polymerization reaction to obtain a slurry containing polypropylene particles and liquid propylene. Reaction conditions were as below.

Polymerization temperature: 50° C.
Stirring speed: 150 rpm
Amount of ethylene supplied with respect to amount of propylene supplied: 0.0015 kg/kg
Amount of hydrogen supplied with respect to amount of propylene supplied: 1.5 NL/kg
Amount of TEA supplied with respect to amount of polypropylene produced in polymerization step I: 6610 ppm
Amount of tert-butyl-n-propyldimethoxysilane supplied with respect to the amount of polypropylene produced in polymerization step I: 2250 ppm
Amount of the slurry of prepolymerization catalyst component supplied with respect to the amount of polypropylene produced in polymerization step I (Conversion of polymerization catalyst components): 0.00068 g/g Polymerization pressure: 3.83 MPa (gauge pressure)

[Polymerization Step II: Ethylene-Propylene Copolymerization in the Multi-Staged Gas-Phase Polymerization Reactor]

A multi-staged gas-phase polymerization reactor was provided, which had 6 stages of reaction regions aligned vertically. An upmost stage among the 6 stages was a fluid bed and remaining 5 stages were spouted beds.

The slurry containing the polypropylene particles and liquid propylene was continuously supplied from the slurry polymerization reactor to a fluid bed that is an upmost stage of the multi-staged gas-phase polymerization reactor without being deactivated.

The transfer of the polypropylene particles from one stage to another within the multi-staged gas-phase polymerization reactor was carried out by a double-valve method. This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the polypropylene particles are moved into a space between the on-off valves from the upstream reaction region and retained in the space, and after the upstream on-off valve is closed thereafter, the downstream on-off valve is opened, so that the polypropylene particles are moved into the downstream reaction region.

Propylene, ethylene and hydrogen were continuously supplied from a lower portion of the multi-staged gas-phase polymerization reactor configured as above. In this way, the ethylene-propylene copolymerization was further carried out by forming a fluid bed or a spouted bed in each of the reaction regions, and controlling the supply amounts of the propylene and hydrogen and purging extra gas in such a way as to maintain a constant gas composition and a constant pressure therein. Reaction conditions were as below.

Polymerization Temperature: 60° C.
Polymerization pressure: 1.80 MPa (gauge pressure)
A concentration ratio of the gases inside the multi-staged gas-phase polymerization reactor was such that (ethylene/(hydrogen+propylene+ethylene))=1.3 mol %, (hydrogen/(hydrogen+propylene+ethylene))=6.4 mol %.

[Polymerization Step III: Ethylene-Propylene Copolymerization in a Fluid Bed-Type Reactor (1)]

The polypropylene particles discharged from the multi-staged gas-phase polymerization reactor were continuously supplied into the fluid bed-type reactor (1). The fluid bed-type reactor (1) for the polymerization step III had one fluid-bed reaction region in a vertical direction and a transfer scheme for the polypropylene particles from the multi-staged gas-phase polymerization reactor into the fluid bed-type reactor (1) was the double-valve method described above.

The copolymerization of propylene and ethylene was carried out in the presence of the polypropylene particles by continuously supplying propylene, ethylene, and hydrogen in the fluid bed-type reactor (1), and controlling the gas supply amounts and purging extra gas in such a way as to maintain a constant gas composition and a constant pressure therein, thereby obtaining heterophasic propylene polymerization material particles F. Reaction conditions were as below.

Polymerization Temperature: 70° C.
Polymerization pressure: 1.50 MPa (gauge pressure)
A concentration ratio of the gases inside the fluid bed-type reactor (1) was such that ethylene/(hydrogen+propylene+ethylene)=41.7 mol %, and hydrogen/hydrogen+propylene+ethylene)±3.31 mol %.

A mass P of the heterophasic propylene polymerization material particles per 1 g of the solid catalyst component was 413776 g/g.

Analysis results of the heterophasic propylene polymerization material particles F thus obtained are shown on Table 4.

(Drying of Heterophasic Propylene Polymerization Material Particles)

Example 1

Figure 2:
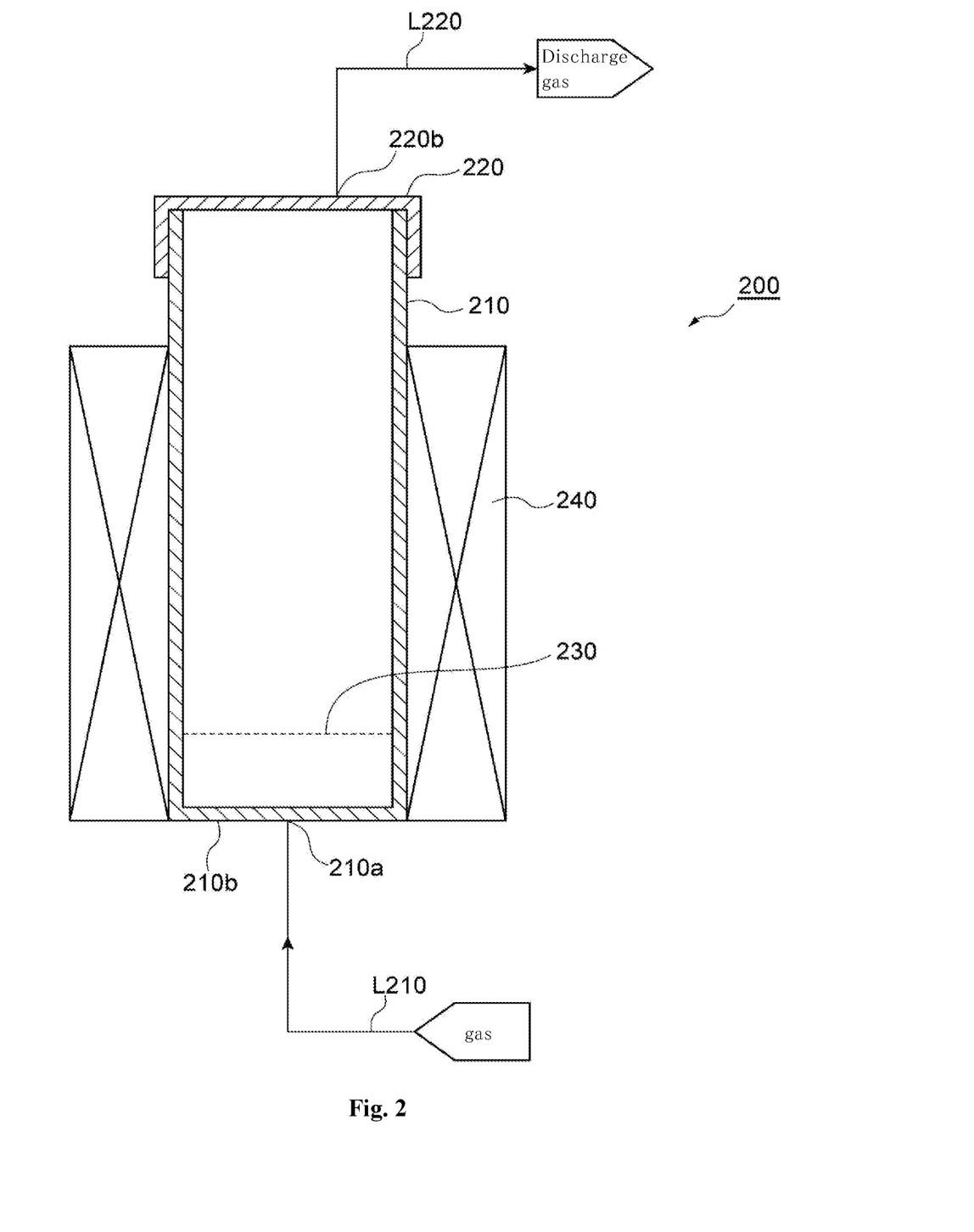
FIG. 2 is a schematic cross-sectional view illustrating a drying device 200 used in Examples.

A drying device 200 for drying particles as illustrated in FIG. 2 was provided. The drying device 200 includes a cylindrical-shaped vessel 210 having a bottom surface 210b, a dispersion plate 230 being provided inside the vessel 210 in such a way as to face the bottom surface 210b and being porous, a lid 220 for covering an upper opening of the vessel 210, and an oil bath 240 provided on a circumference surface of the vessel 210. An opening 210a provided on the bottom surface 210b of the vessel 210 is connected with a line L210 for gas supply, and an opening 220b provided on the lid 220 is connected with a line L220 for gas discharge. A capacity of the vessel 210 was 2 L and capable of containing 80 g of a heterophasic propylene polymerization material.

Into the vessel 210 of the drying device 200, 50 g of the heterophasic propylene polymerization material particles A thus produced as above were supplied via the upper opening of the vessel 210, and the lid 220 was closed. The heterophasic propylene polymerization material particles A were left to stand in a state where the temperature of the particles inside the vessel 210 was adjusted to 90° C. by the oil bath 240. Thereafter, the inside of the vessel 210 was ventilated for a contact time period of 2 hours with nitrogen being heated to 90C and being supplied therein at a flow rate of 0.1 Nm/h via the line L210 and the opening 210a, thereby drying the volatile component off from the particles so as to dry the particles.

Example 2

Example 2 was carried out in the same manner as in Example 1, except that the contact time period between the particles and the nitrogen gas was 3 hours.

Example 3

Example 3 was carried out in the same manner as in Example 1, except that the temperatures of the particles and the nitrogen gas were 100° C.

Example 4

Example 4 was carried out in the same manner as in Example 1, except that the temperatures of the particles and the nitrogen gas were 70° C.

Example 5

Example 5 was carried out in the same manner as in Example 4, except that the contact time period between the particles and the nitrogen gas was 3.5 hours.

Example 6

Example 6 was carried out in the same manner as in Example 2, except that the temperatures of the particles and the nitrogen gas were 80° C.

Example 7

Example 7 was carried out in the same manner as in Example 1, except that the particles B were used instead of the particles A and the temperatures of the particles and the nitrogen gas were 80° C.

Example 8

Example 8 was carried out in the same manner as in Example 7, except that the contact time period between the particles and the nitrogen gas was 3 hours.

Example 9

Example 9 was carried out in the same manner as in Example 4, except that the contact time period between the particles and the nitrogen gas was 1 hours.

Example 10

Example 10 was carried out in the same manner as in Example 1, except that the particles D were used instead of the particles A and the temperatures of the particles and the nitrogen gas were 65° C.

Example 11

Example 11 was carried out in the same manner as in Example 10, except that the contact time period between the particles and the nitrogen gas was 3 hours.

Example 12

Example 13 was carried out in the same manner as in Example 10, except that the particles F were used instead of the particles D.

Example 13

Example 12 was carried out in the same manner as in Example 11, except that the particles F were used instead of the particles D.

Comparative Example 1

Comparative Example 1 was carried out in the same manner as in Example 1, except that the particles C were used instead of the particles A, the temperatures of the particles and the nitrogen gas were 70° C., and the contact time period between the particles and the nitrogen gas was 0.5 hours.

Comparative Example 2

Comparative Example 2 was carried out in the same manner as in Comparative Example 1, except that the contact time period between the particles and the nitrogen gas was 1 hours.

Comparative Example 3

Comparative Example 3 was carried out in the same manner as in Example 3, except that the contact time period between the particles and the nitrogen gas was 3 hours.

Comparative Example 4

Comparative Example 4 was carried out in the same manner as in Comparative Example 3, except that the temperatures of the particles and the nitrogen gas were 40° C.

The experiment conditions such as the temperatures T in drying and the contact time period in drying are shown on Tables 2, 3 and 5.

TABLE 2

|  | Example 1 | Example 2 | Example 3 | Example 4 | Example 5 | Example 6 | Example 7 | Example 8 |
|---|---|---|---|---|---|---|---|---|
| Heterophasic propylene polymerization material particles | A | A | A | A | A | A | B | B |
| Median diameter of solid catalyst component before polymerization, d[μm] | 67 | 67 | 67 | 67 | 67 | 67 | 67 | 67 |
| Mass P of heterophasic propylene polymerization material particles per 1 g of solid catalyst component [g/g] | 68734 | 68734 | 68734 | 68734 | 68734 | 68734 | 39209 | 39209 |
| Average particle diameter of heterophasic propylene polymerization material particles [μm] | 2814 | 2814 | 2814 | 2814 | 2814 | 2814 | 2116 | 2116 |
| Content C of component (II) in heterophasic propylene polymerization material particles, [mass %] | 54.6 | 54.6 | 54.6 | 54.6 | 54.6 | 54.6 | 39.3 | 39.3 |
| Temperature T [° C.] | 90 | 90 | 100 | 70 | 70 | 80 | 80 | 80 |
| Contact time period t [h] | 2.0 | 3.0 | 2.0 | 2.0 | 3.5 | 3.0 | 2.0 | 3.0 |
| $T^{1.12} \cdot t^{0.17}/(d \cdot (0.85 \cdot P)^{1/3})^{0.13} \cdot (C/100)^{0.61}$ | 43.2 | 46.3 | 48.6 | 32.6 | 35.9 | 40.6 | 31.3 | 34.0 |
| Volatile component removing rate [%] | — | — | — | >99 | >99 | >99 | — | — |
| Pressure at lower end of hopper left to stand [kg/m²] | 154 | 154 | 154 | 154 | 154 | 154 | 154 | 154 |
| Load necessary for discharge of particles [kg] | 2.0 | 2.6 | 2.2 | 1.0 | 1.4 | 1.6 | 0.5 | 0.9 |

TABLE 3

|  | Comparative Example 1 | Comparative Example 2 | Comparative Example 3 | Comparative Example 4 |
|---|---|---|---|---|
| Heterophasic propylene polymerization material particles | C | C | A | A |
| Median diameter of solid catalyst component before polymerization, d[μm] | 29 | 29 | 67 | 67 |
| Mass P of heterophasic propylene polymerization material particles per 1 g of solid catalyst component [g/g] | 38980 | 38980 | 68734 | 68734 |
| Average particle diameter of heterophasic propylene polymerization material particles [μm] | 1192 | 1192 | 2814 | 2814 |
| Content C of component (II) in heterophasic propylene polymerization material particles, [mass %] | 20.5 | 20.5 | 54.6 | 54.6 |
| Temperature T [° C.] | 70 | 70 | 100 | 40 |
| Contact time period t [h] | 0.5 | 1.0 | 3.0 | 3.0 |
| $T^{1.12} \cdot t^{0.17}/(d \cdot (0.85 \cdot P)^{1/3})^{0.13} \cdot (C/100)^{0.61}$ | 16.2 | 18.2 | 52.1 | 18.7 |
| Volatile component removing rate [%] | 85 | 94 | — | 82 |
| Pressure at lower end of hopper left to stand [kg/m²] | 150 | 152 | 154 | 154 |
| Load necessary for discharge of particles [kg] | 1.6 | 3.0 | 3.0 | 1.0 |

TABLE 5

|  | Example 9 | Example 10 | Example 11 | Example 12 | Example 13 |
|---|---|---|---|---|---|
| Heterophasic propylene polymerization material particles | A | D | D | F | F |
| Median diameter of solid catalyst component before polymerization, d[μm] | 67 | 58 | 58 | 62 | 62 |
| Mass P of heterophasic propylene polymerization material particles per 1 g of solid catalyst component [g/g] | 68734 | 27041 | 27041 | 41776 | 41776 |
| Average particle diameter of heterophasic propylene polymerization material particles [μm] | 2814 | 1974 | 1974 | 2085 | 2085 |
| Content C of component (II) in heterophasic propylene polymerization material particles, [mass %] | 54.6 | 50.9 | 50.9 | 44.5 | 44.5 |
| Temperature T [° C.] | 70 | 65 | 65 | 65 | 65 |
| Contact time period t [h] | 1.0 | 2.0 | 3.0 | 2.0 | 3.0 |

TABLE 5-continued

|  | Example 9 | Example 10 | Example 11 | Example 12 | Example 13 |
|---|---|---|---|---|---|
| $T^{1.12} \cdot t^{0.17}/(d \cdot (0.85 \cdot P)^{1/3})^{0.13} \cdot (C/100)^{0.61}$ | 29.0 | 30.5 | 32.7 | 27.3 | 29.3 |
| Volatile component removing rate [%] | >99 | >99 | >99 | >99 | >99 |
| Pressure at lower end of hopper left to stand [kg/m$^2$] | — | 154 | 154 | 154 | 154 |
| Load necessary for discharge of particles [kg] | — | 0.6 | 1.1 | 0.5 | 0.9 |

(Measurement of Volatile Component Removing Rate)

A mass concentration $C_0$ of the volatile component in the particles before the drying and a mass concentration $C_1$ of the volatile component in the particles after the drying were measured, and a volatile component removing rate was worked out from the following Equation:

Volatile component removing rate=$(1-C_1/C_0)$

The mass concentrations $C_1$ and $C_0$ of the volatile component were measured as below.

The particles were heated at 120° C. for 1 hours in an autosampler, thereby volatilizing off the volatile component in the particles, and concentration of contents of the volatile component thus volatilized were measured by a gas chromatography device connected to the autosampler. The volatile component mainly includes hexane, octane, decane, and dodecane.

The gas chromatography device used was GC-2010AF of Shimadzu Corp. provided with DE-WAX (Agilent Technologies) as its column. The volatile component removing rates of Examples and Comparative Examples are shown on Tables 2, 3 and 5.

The actual measurement of the volatile component removing rate was not conducted for Examples 1 to 3, but because the temperature T was higher than Example 4 and the contact time period t was equal to or longer than that in Example 4, it is clearly understood that the volatile component removing rate would be higher than 99%.

(Evaluation of Viscosity of the Heterophasic Propylene Polymerization Material Particles after Drying)

Figure 3:
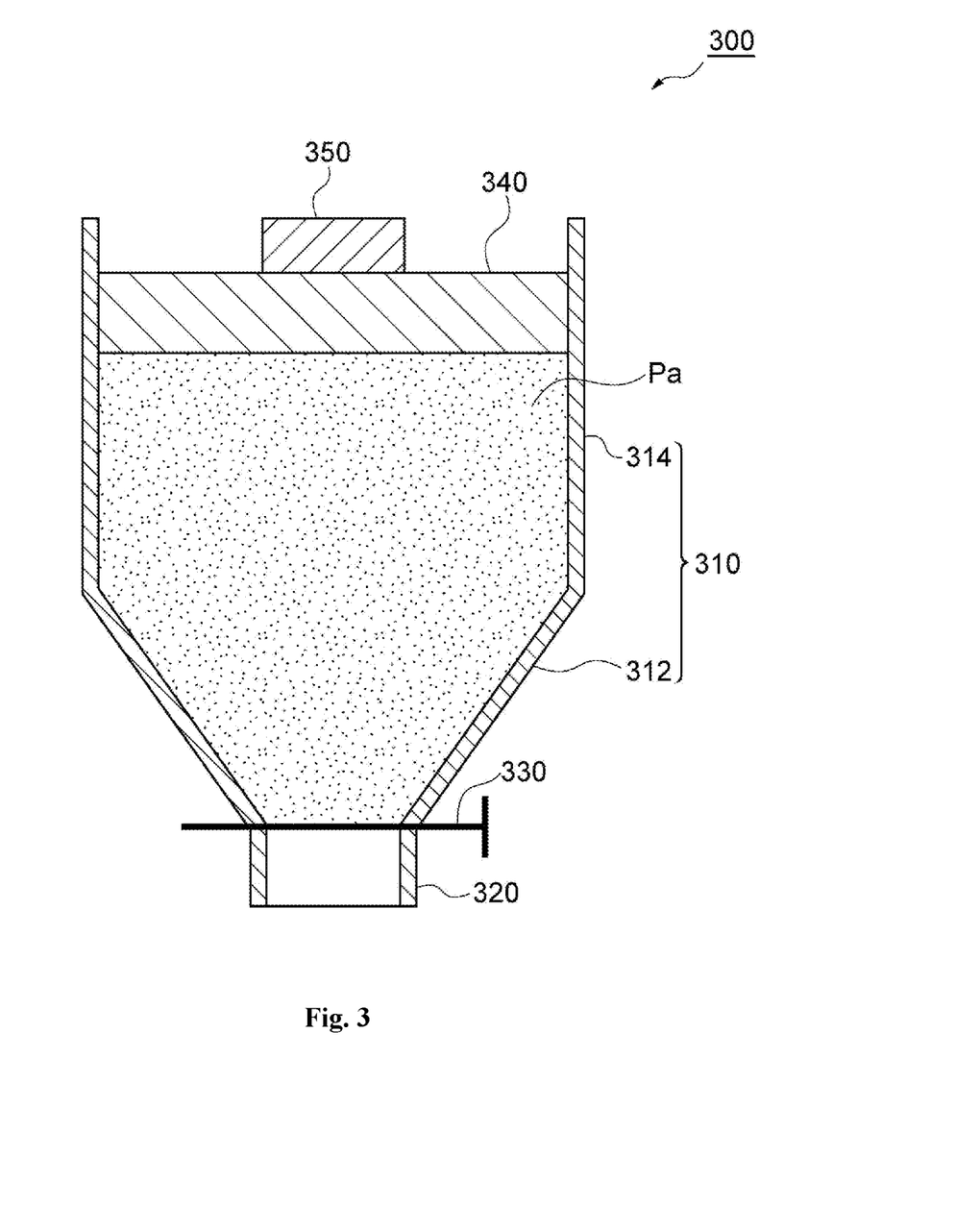
FIG. 3 is a cross-sectional view of a viscosity evaluation device 300 used in Examples.

By using a viscosity evaluation device 300 as illustrated in FIG. 3, viscosity of the heterophasic propylene polymerization material particles after the drying was evaluated after the particles were left to stand inside a hopper under loading condition at the temperatures T for the contact time periods t of Examples and Comparative Examples. A discharging hopper 310 was provided, which had a capacity of 3 L and was capable of containing 130 g of heterophasic propylene polymerization material particles. The hopper 310 had a cone portion 312 with an internal diameter tapered downwardly, and a cylindrical portion 314 connected onto the cone portion 312. A discharging pipe 320 for discharging the particles was provided at a lower end of the cone portion 312, and a gate valve 330 was provided between the discharging pipe 320 and the cone portion 312. An upper end of the cylindrical portion 314 was opened, so that a piston 340 with a weight 350 provided thereon could be inserted therein to apply a load onto a particle bed Pa contained inside the hopper 310.

(Consolidation Step)

After 130 g of the heterophasic propylene polymerization material particles after the drying were supplied into the hopper 310, the hopper 310 was kept in a thermostat bath to bring the temperature of the particles to a temperature equal to the temperature T of Examples and Comparative Example, and the particles were left to stand for a time period equal to the contact time period t of Examples and Comparative Examples. While the particles were left to stand as such, the weight 350 and the piston 340 with a total weight in a range of 1.5 to 1.8 kg were placed on the particles inside the hopper 310 so as to consolidate the particles. Pressure applied on the gate valve 330 in consolidating was estimated to be approximately 150 kg/m$^2$ by using Jensen's inequality, as shown on Tables 2, 3 and 5.

(Discharging Step)

After the consolidation step, the weight 350 and the piston 340 were removed from the hopper 310, and thereafter the gate valve 330 was opened. Due to the consolidation of the particles, the particles would not be discharged from the discharging pipe 320 generally, even if the gate valve 330 was opened. Next, a weight 350 and the piston 340 with a total weight of 100 g were placed on the particles with the gate valve 330 kept open, and whether or not the discharge of the particles would occur was observed. If the discharge of the particles would not occur in 1 min from the placement of the weight 350 and the piston 340, an additional weight of 100 g was additionally placed. The addition of the additional weight of 100 g was repeated until the discharge of the particles started. In this way, a load necessary to cause the discharge of the particles was determined for each of Examples and Comparative Examples. When the load was greater, the particles were evaluated as having a greater viscosity and being more likely to cause clogging troubles. Results of this test are shown on Tables 2, 3 and 5.

It was demonstrated that the conditions of Examples were able to sufficiently remove the volatile component while down-regulating the increase of the load necessary for the discharge of the particles.

What is claimed is:

1. A method for producing heterophasic propylene polymerization material particles, the method comprising:
  (1) performing monomer polymerization in the presence of a catalyst including a solid catalyst component so as to obtain a component (I) recited below;
  (2) performing monomer polymerization in the presence of the component (I) so as to obtain a component (II), so that particles including a volatile component, the component (I), and the component (II) are produced; and
  (3) causing the particles to contact with an inert gas-containing stream so as to remove the volatile component from the particles,
  the particles including the component (I) by 20 to 70 mass %, and the component (II) by 30 to 80 mass %, and the method satisfying Inequation (1):

$$19.5 \leq T^{1.12} \cdot t^{0.17} \cdot (C/100)^{0.61}/(d \cdot (0.85 \cdot P)^{1/3})^{0.13} \leq 51.4 \quad (1)$$

where T [° C.] is a temperature that the particles have when the particles contact with the inert gas-containing stream, t [h] is a contact time period in which the particles contact with the inert gas-containing stream, d

[μm] is a median diameter that the solid catalyst component has at the time of start of step (1), P [g/g] is a mass of the particles per 1 g of the solid catalyst component, and C [mass %] is the content of the component (II) in the particles, the component (I) including a component (I-1) and/or a component (I-2), the component (I-1) being a propylene homopolymer, the component (I-2) being a propylene copolymer including a propylene-derived structural unit and at least one type of olefin-derived structural unit selected from the group consisting of ethylene and C4 to C12 α-olefins, wherein a mass ratio of the at least one type of olefin-derived structural unit in the mass of the copolymer is less than 15 mass %, and the component (II) being a propylene copolymer including a propylene-derived structural unit and at least one type of olefin-derived structural unit selected from the group consisting of ethylene and C4 to C12 α-olefins, wherein a mass ratio of the at least one type of olefin-derived structural unit in the mass of the copolymer is in a range of 15 to 80 mass %.

2. The method according to claim 1, wherein counter currents of the particles and the inert gas-containing stream are caused to contact with each other.

3. The method according to claim 1, wherein the following Inequation (2) is further satisfied:

$$26.5 \leq T^{1.12} \cdot t^{0.17} \cdot (C/100)^{0.61}/(d \cdot (0.85 \cdot P)^{1/3})^{0.13} \qquad (2).$$

4. The method according to claim 2, wherein the following Inequation (2) is further satisfied:

$$26.5 \leq T^{1.12} \cdot t^{0.17} \cdot (C/100)^{0.61}/(d \cdot (0.85 \cdot P)^{1/3})^{0.13} \qquad (2).$$

5. The method according to claim 1, wherein a mass P of the heterophasic propylene polymerization material particles finally obtained after step (2) (yield of the Steps (1) and (2)) be in a range of 20,000 to 90,000 g/g per 1 g of the solid catalyst component.

6. The method according to claim 1, wherein an average particle diameter of the heterophasic propylene polymerization material particles is in a range of 1,000 to 5,000 μm.

* * * * *